United States Patent
Guinan

[19]

[11] Patent Number: 6,022,222

[45] Date of Patent: Feb. 8, 2000

[54] ICON LANGUAGE TEACHING SYSTEM

[75] Inventor: Mary Beth Guinan, 940 Michigan, Evanston, Ill. 60202

[73] Assignee: Mary Beth Guinan, Evanston, Ill.

[21] Appl. No.: 08/941,902

[22] Filed: Sep. 30, 1997

Related U.S. Application Data

[63] Continuation of application No. 08/724,055, Sep. 23, 1996, abandoned, which is a continuation of application No. 08/176,729, Jan. 3, 1994, abandoned.

[51] Int. Cl.$^7$ ........................................ G09B 5/00
[52] U.S. Cl. ..................... 434/169; 434/156; 434/157; 434/167; 434/185; 434/307 R; 704/1; 704/9; 706/927; 345/473
[58] Field of Search .................... 434/112, 118, 434/156, 167, 169, 185, 307 R, 157, 308, 429, 365, 323, 362; 340/825.19; 364/578; 379/52; 706/927, 15, 45; 341/21, 22, 28; 345/146, 302, 328, 473, 326; 704/1–10

[56] References Cited

U.S. PATENT DOCUMENTS

| | | | |
|---|---|---|---|
| 4,165,890 | 8/1979 | Leff | 434/112 X |
| 4,785,420 | 11/1988 | Little | 379/52 X |
| 4,884,972 | 12/1989 | Gasper | 434/169 X |
| 5,109,482 | 4/1992 | Bohrman | 395/154 |
| 5,120,230 | 6/1992 | Clark et al. | 434/307 R |
| 5,169,342 | 12/1992 | Steele et al. | 434/112 |
| 5,173,051 | 12/1992 | May et al. | 434/118 |
| 5,297,041 | 3/1994 | Kushler et al. | 340/825.19 X |
| 5,299,125 | 3/1994 | Baker et al. | 434/112 X |

FOREIGN PATENT DOCUMENTS 58-175075  10/1983  Japan ................................ 364/419.08

OTHER PUBLICATIONS

"Representations of Verbs in a Computerized Visual Communication System" Weinrich, Steele, Kleczewska, Stevens, Carlson, Baker Wertz, *Aphasiology*, vol. 3 #6, 501–512, 1989.

"Processing of Visual Syntax in a Globally Aphasic Patient" Weinrich, Steel, Carlson, Kleczewska, *Brain & Language* 36, pp. 391–403.

Bulkeley, *Wall St. Journal* : "Translation Software Falls Short of Fluency", "Software Tackles many Tongues".

Creative Learning Catalogue.

*Primary Examiner*—Joe H. Cheng

[57] ABSTRACT

A computerized system and method for learning a natural language through the visual depiction of grammar is described. The system employs icons that are strung together in sentences that exactly parallel the word order of the natural language being studied. Icons are used to represent all parts of speech, and also to provide a pictorial representation of tense and number.

4 Claims, 21 Drawing Sheets

ICON LANGUAGE TEACHING SYSTEM

This application is a continuation of application Ser. No. 08/724,055, filed on Sep. 23, 1996, now abandoned, which is a continuation of application Ser. No. 08/176,729, filed on Jan. 3, 1994, now abandoned.

FIELD OF THE INVENTION

This invention relates to apparatuses and methods for the learning of a target language through the use of a multimedia display system. In particular, the invention relates to an interactive, computerized system in which the user accesses lessons that employ sentences composed wholly of icons. These icons represent all parts of speech, and also depict tense and number. The system further requires the user to input the text that corresponds to a given icon, typically by computer keystroke. Finally, in certain embodiments, the system provides a voiced translation for each icon that is contained in the system. The system therefore comprises a multi-sensory—visual, auditory and tactile—approach to the learning of a target language.

BACKGROUND OF THE INVENTION

The use of pictographic symbols to represent words or concepts is synonymous with written history. This century has witnessed an increased use of symbols to represent information specific to a particular discipline, such as science, commerce, and travel. These symbols are particularly useful in the communication of information in an international context. Large collections of icons for the communication of information have been developed by persons such as Otto Neurath with his ISOTYPE, which originated in Vienna, Austria, in 1930, and Katsumie Masaure, with her icon compilation for the 1960 Tokyo Olympics. These icon collections have not been used in the context of a language system which permits them to be used as sentence components.

In the recent past, some efforts have been made to create a symbolic language system. For example, Charles K. Bliss developed "Sementography," an abstract symbolic language, which uses highly abstract symbols to replace words. Sementography is limited, however, in that it does not provide a visual depiction of grammatical structure.

Recognizing the value of the use of graphic illustrations in the teaching of a second language, literacy advocates have begun using them in a variety of multi-sensory teaching systems. For example, Davidson's "English Express" is a multi-media educational package that uses such illustrations which are contained in a photo dictionary on videodisc.

Moreover, the development of computer systems and software that support multi-sensory teaching methods has enabled educators to implement such graphical teaching methods more effectively than they previously could. The use of computers to combine pictorial representations with auditory responses has been widespread. Products such as the "Creative Learning" teaching system use a personal computer to pair certain words with graphic illustrations and auditory voice responses. Another system, Future Trend Software's E-Z LANGUAGE teaching system, also pairs selected words with graphic illustrations to facilitate the learning of a second language.

All of the above-mentioned systems, however, have significant limitations. First, none of these systems rely on icon strings alone (without added text) to convey their lessons. Instead of using icons, these systems use photographs or graphic illustrations in their lessons. Because of their reliance on these media, these systems necessarily require more memory (many use CD-ROM), and often require the use of more sophisticated computers. Second, none of these systems use icons to represent all parts of speech. Instead, to the extent these systems rely on graphic illustrations, they use them only for easily visualized objects or actions, and do not use them to represent tense, number or other grammatical aspects. Third, none of these systems have a one-to-one correspondence between a word in the language to be learned and the pictorial representation of that word. It is only with such correspondence that syntax, including word order, can be taught. Fourth, none of these systems inextricably link an icon to a specific text that is typed in by the system's user. Rather, many of these systems use text that is not linked to a specific icon, but is used instead to fill in the sentence gaps that are not represented by an icon. Fifth, the inability of these systems to represent each word with an illustration also prevents them from linking voiced translations solely to such illustrations. Instead, many of these systems use a voiced translation to fill in the gaps in the sentence that are not represented by an illustration. None of these systems are therefore able to fuse, from the user's perspective, the text, icon and voiced translation into a single entity, or icon block. Finally, none of these systems use graphic illustrations to demonstrate grammatical structure and word order for the language being learned. The present invention seeks to overcome these infirmities.

SUMMARY OF THE INVENTION

The present invention is an icon language teaching system for use on a computer that has a visual display such as a monitor. The system provides the user with lessons in language instruction using an icon-based language system. An icon is used to represent each word that is either introduced or available for use in a system lesson. The system provides the user with icon strings, which are used to represent sentences in the language to be taught. The icon strings are constructed so that a one to one correspondence exists between the icons and the words in the sentence. The user inputs the word associated with a given icon in an icon string, and the system evaluates the user's input to determine whether it is correct. If the user's input is not correct, the system will, in certain embodiments, provide feedback to the user that she has erred.

In certain embodiments, the system provides the user with a voiced translation of the word that corresponds with an icon. The inclusion of the voiced translation—for a fusion of icon, text and voiced translation—further facilitates and expedites the learning process, enabling the user to learn to speak the language in addition to learning to read and write.

Certain embodiments also provide the user with icon dictionaries—a list of all icon blocks (either with or without voiced translations) that are either introduced or available for use in the system lessons. Portions of this dictionary may be displayed on the screen of a sample lesson, and may be used during the lesson to highlight the correct word to be input by the user.

It is therefore an object of the present invention to use strings of icons, rather than photographs or graphic illustrations, to convey its lessons. The use of icons significantly increases the efficiency of the teaching system, by reducing the memory required to store the pictorial representations, and enabling the system to be run on less sophisticated computer equipment.

It is also an object of the invention to provide lessons in which icons are used to represent all parts of speech, and in which the icons are designed to enable the user to ascertain the number and tense of the word simply by viewing the icon.

It is also an object of the invention to provide lessons in which a one to one correspondence exists between a word, and the pictorial representation of that word (i.e., the icon). Because the invention requires such correspondence between its icons and each word or symbol in the second language, the need for reliance on text from the first language is completely obviated. By eliminating the user's reliance on the first language, the learning process is expedited, and enables the user to "think" in the second language.

It is also an object of the invention to provide the system user with means to type in the text that corresponds to each icon. The addition of this tactile dimension reinforces the user's learning.

It is also an object of the invention to provide a voiced translation for each icon used in the lessons. The fusion of icons, text and voiced translations, from the user's perspective, provides a complete visual and auditory dictation for the user, further obviating the need for reliance on the user's first language.

It is also an object of the invention to construct lesson sentences wholly with icons. Because an icon exists for each part of speech, the System is able to construct sentences represented by icon strings in which the icons take the place of the words. This visual depiction of grammar allows the user to learn not by translation, but rather, by the same developmental processes at work when she learned her first language.

BRIEF DESCRIPTION OF THE DRAWINGS

The present invention will be further described in the following portions of this specification when taken in conjunction with the attached drawings in which.

DETAILED DESCRIPTION OF AN EMBODIMENT OF THE INVENTION

Figure 25:
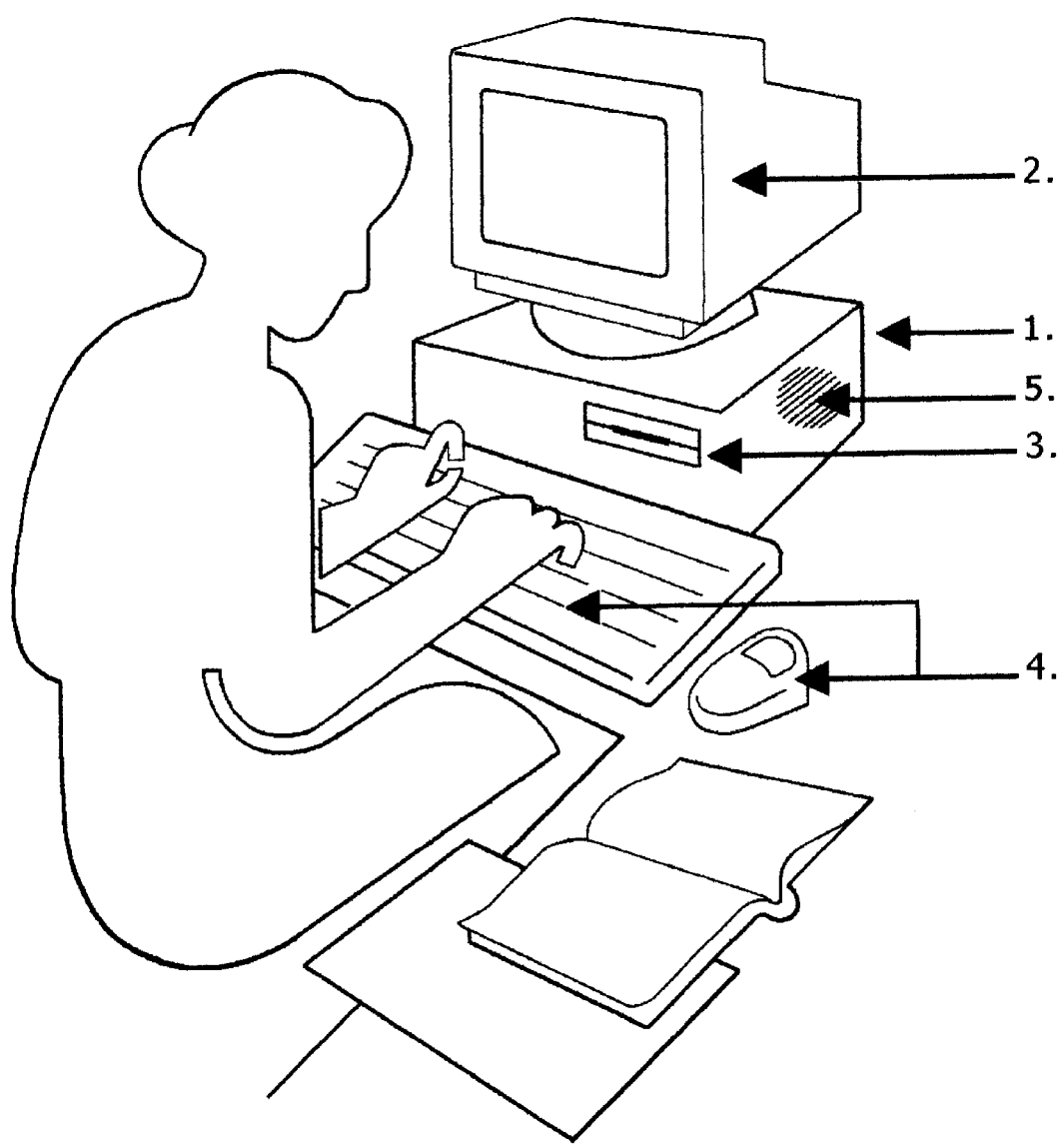
FIG. 25 is a schematic view of an embodiment of the invention providing computer hardware for implementing the programmatic instructional means of the invention, and including input and output devices.

To begin using the present invention (the "System"), the user accesses a System lesson through the user work station as shown in FIG. 25, including computer 66 having graphic display and processing capability, such as an APPLE MACINTOSH IIci computer. The System also includes a visual display means 67, such as a monitor, and a keyboard 68 that is capable of inputting all of the letters or symbols in the language to be learned. The System may also include an additional user-input device such as a mouse 69. A preferred embodiment also provides sound capability through the use of auditory output means 70. To provide this capability, the system may incorporate any one of many devices, modules or programs—such as a sound card—that are commonly known to those skilled in the art.

In certain embodiments, the software uses an executable file to generate the lesson screen from a list of resources located in separate resource files 71. These resource files contain the text, graphic and voice information needed for a given lesson.

Figure 1:
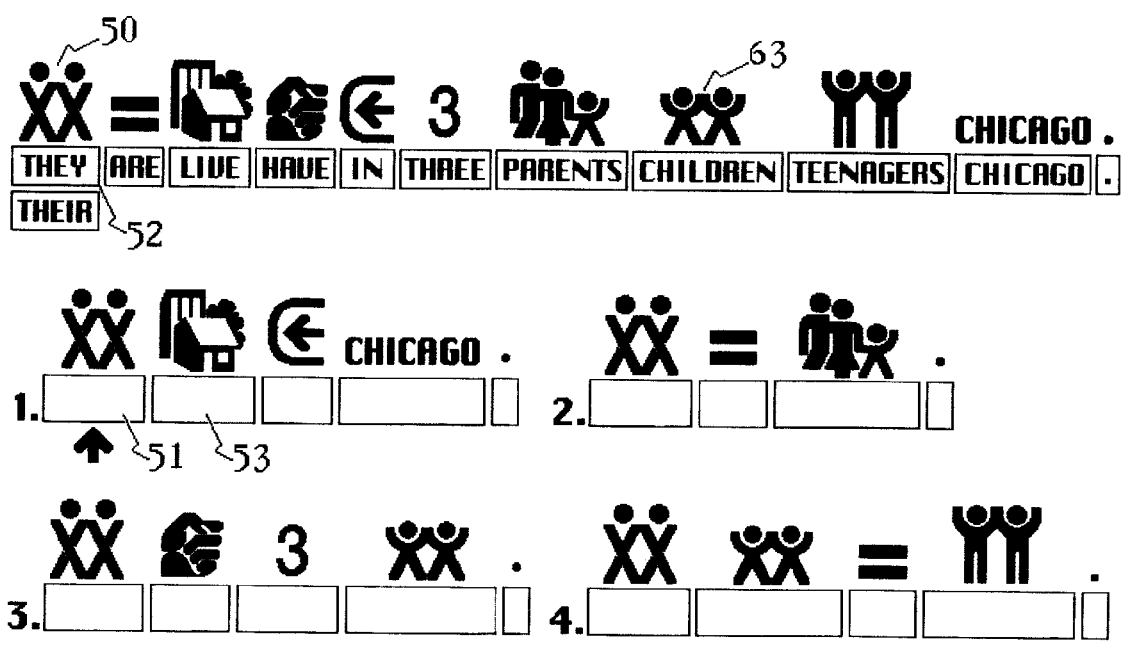
FIG. 1 is a display screen exemplary of the invention containing a sample lesson in English.
Figure 2:
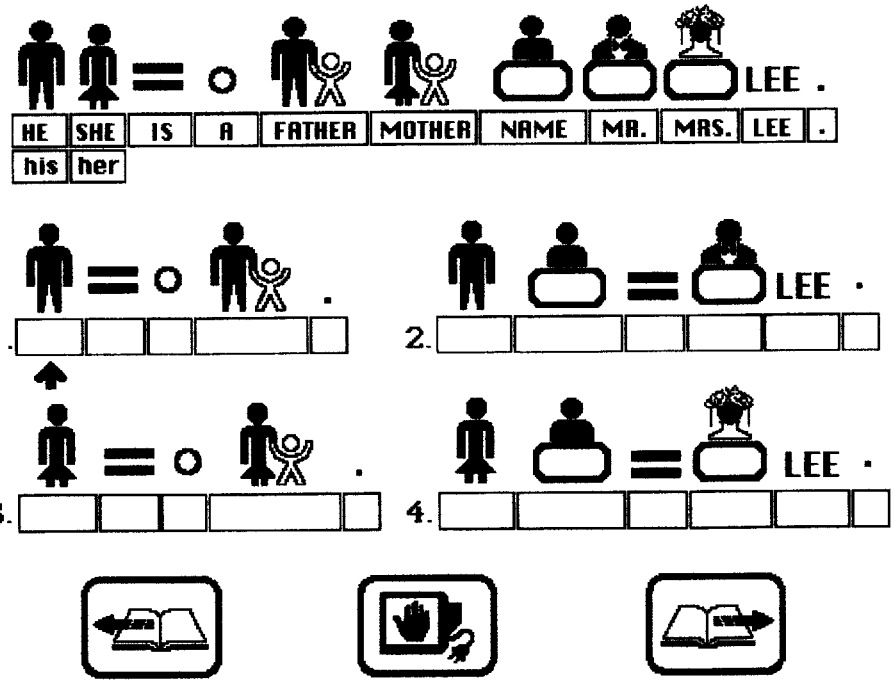
FIG. 2 is a display screen exemplary of the invention containing a sample lesson in English.
Figure 3:
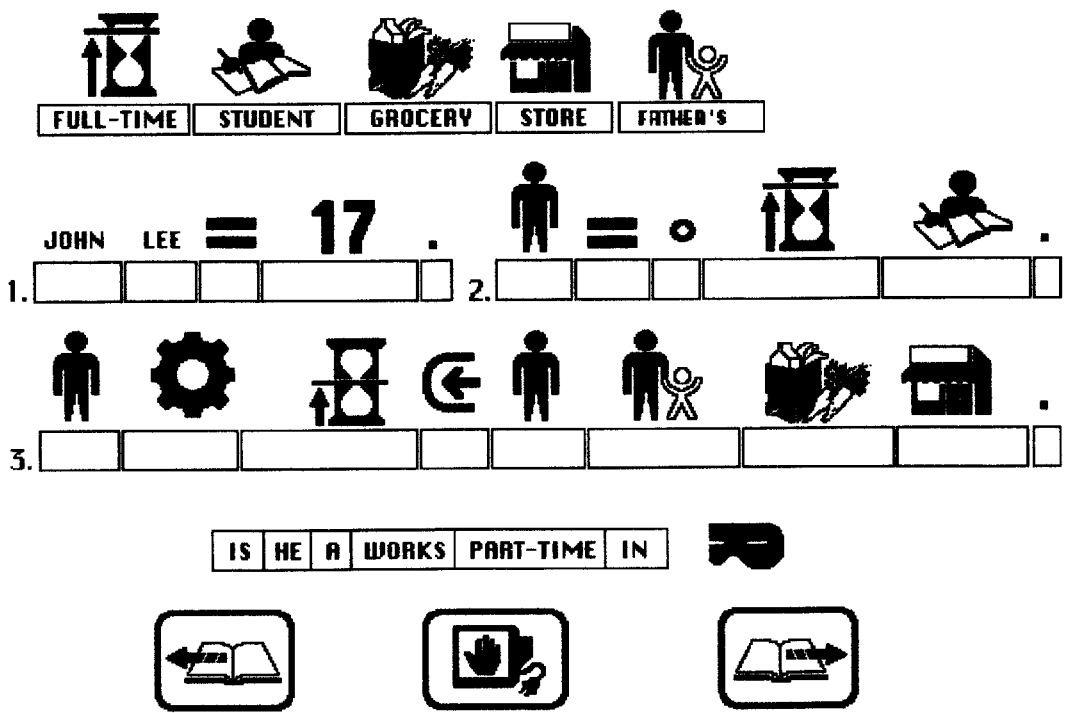
FIG. 3 is a display screen exemplary of the invention containing a sample lesson in English.
Figure 4:
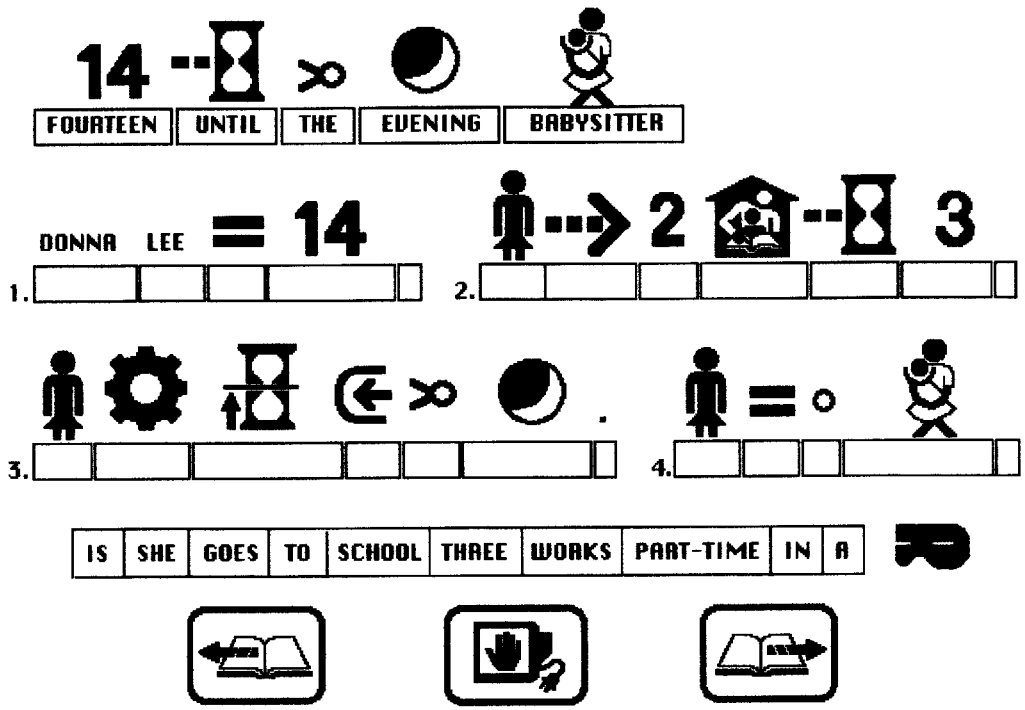
FIG. 4 is a display screen exemplary of the invention containing a sample lesson in English.
Figure 5:
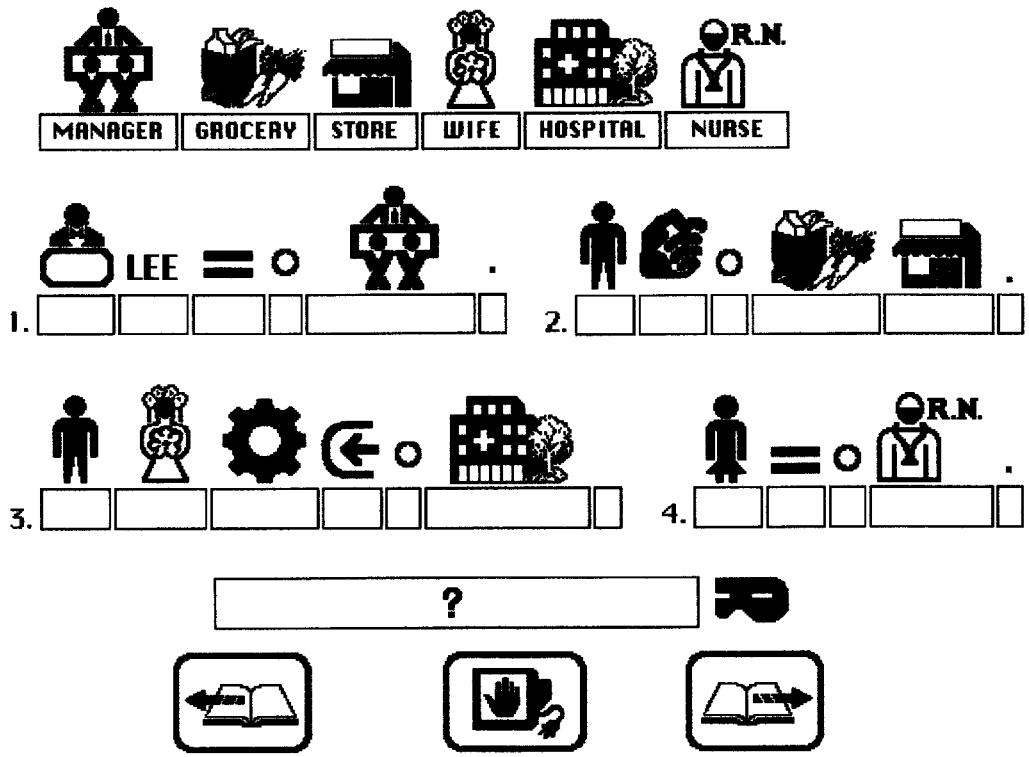
FIG. 5 is a display screen exemplary of the invention containing a sample lesson in English.
Figure 6:
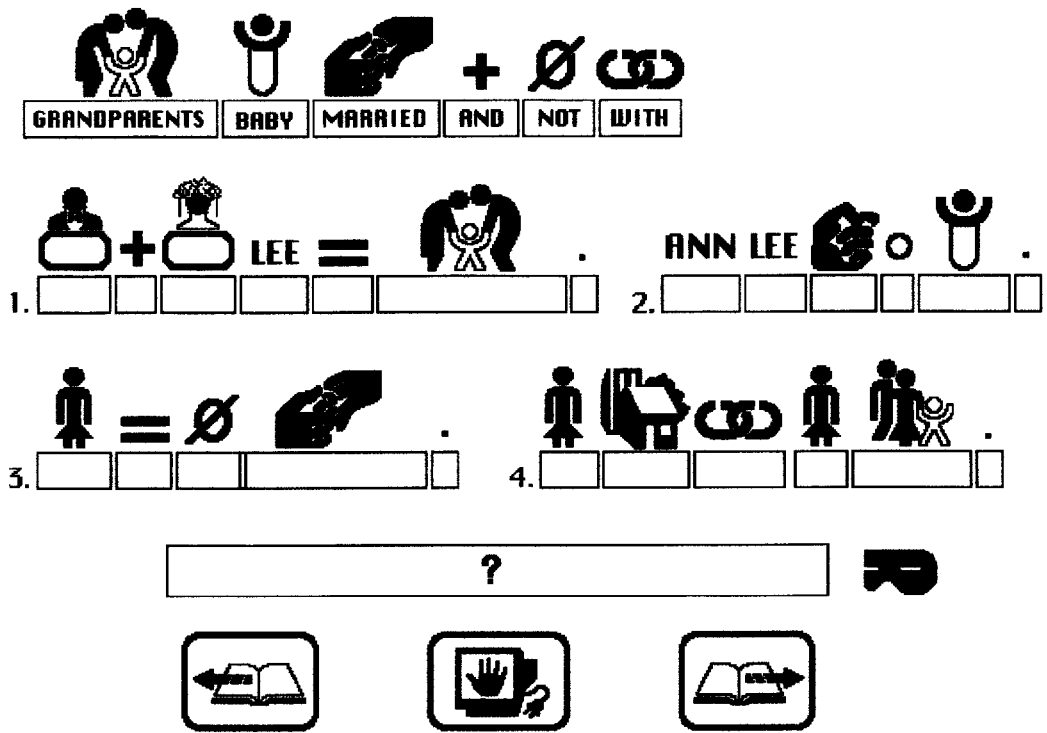
FIG. 6 is a display screen exemplary of the invention containing a sample lesson in English.
Figure 7:
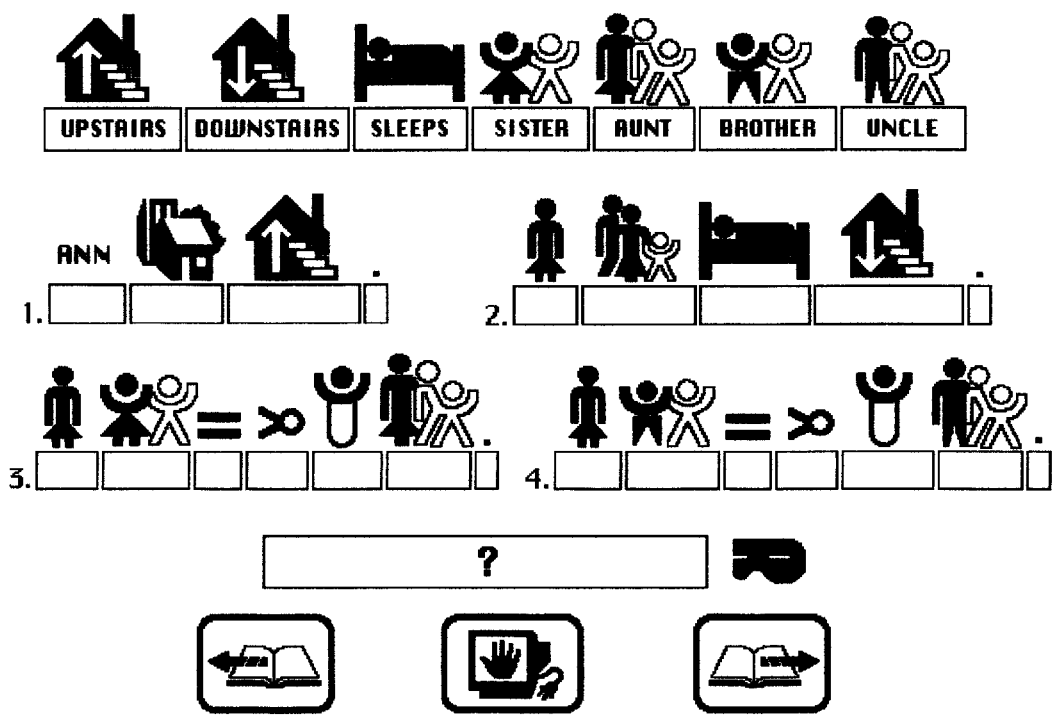
FIG. 7 is a display screen exemplary of the invention containing a sample lesson in English.
Figure 8:
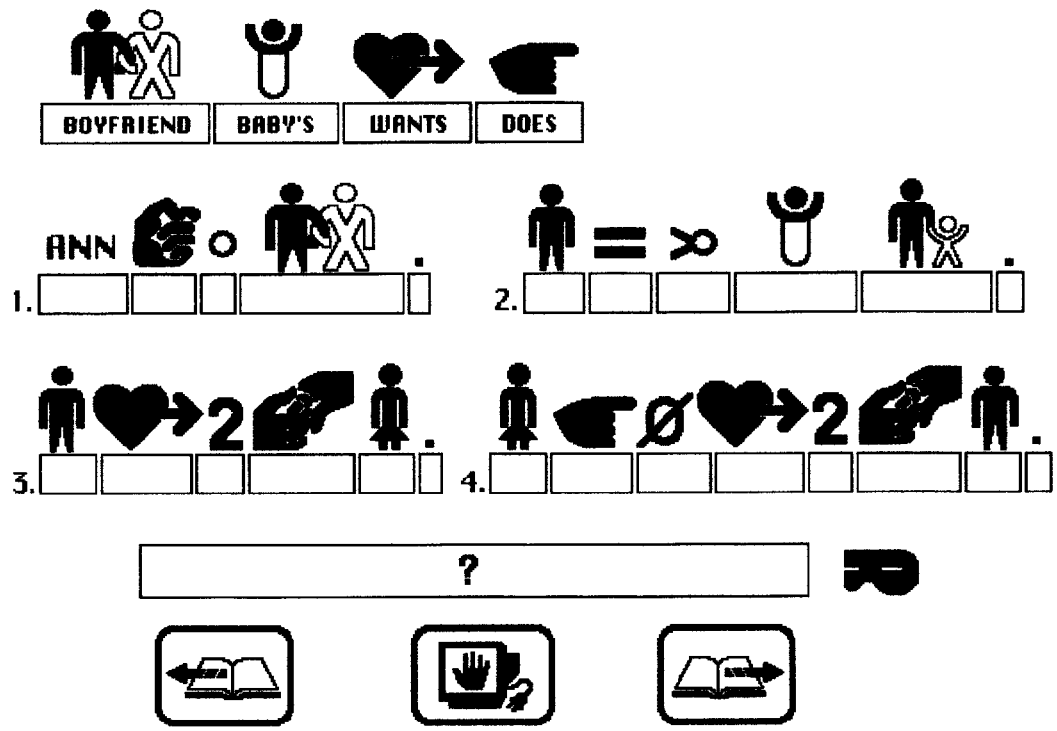
FIG. 8 is a display screen exemplary of the invention containing a sample lesson in English.

Once the user has accessed the lesson via the computer, the user views the lesson on the display. A sample lesson screen of one embodiment of the invention is shown in FIG. 1. The top line of the screen in the illustrated embodiment is an icon dictionary 50 for the sample lesson, which contains the corresponding icon block for each new word introduced in the lesson. An icon block is composed of the icon, the text of the word represented by the icon, and, preferably the voiced translation of the word, all fused, from the user's perspective, into a single entity. For example, in FIG. 1, the first entry in the dictionary 50 represents two icon blocks—the icon representing the words "they" and "their", the text of the words "they" and "their" and, in certain embodiments, the voiced translations for the words "they" and "their."

The other lines on the sample screen in FIG. 1 are the lesson's icon sentences, i.e., sentences composed wholly of icons. In these icon sentences, each word in the sentence (with the exception of proper names) is represented by a distinct icon. At the beginning of the lesson, an arrow-shaped cursor highlights the first empty text box in the first icon sentence. For example, in the first icon sentence in FIG. 1, the System would highlight the empty box under the icon for "they" and "their." 51. At the same time, the System, in certain embodiments, emits the voiced translation for the appropriate word that the user should type. (When the lessson is initially created, the System is instructed to highlight the appropriate word—as between "they" and "their"—based on the location of that word and its context in the sample sentence.) Additionally, the appropriate word in the icon dictionary is also highlighted 52. These three prompts—the sentence prompt, the auditory prompt and the icon dictionary prompt—are transmitted and perceived by the user simultaneously.

The user then uses the keyboard to type in the appropriate word—"they." It should be noted that the user need not have knowledge of the alphabet of the target language, but instead, need only match the letters on the keyboard to the letters in the highlighted dictionary block. Moreover, in the event that the user does not type the word correctly, the System, in certain embodiments, may provide the user with immediate aural or other feedback to indicate the error. In those embodiments that provide error detection means, the computer compares the string of characters input by the user to the appropriate character string stored in memory to determine whether the user input is correct. If the user input matches the data stored in memory, the System proceeds to the next icon in the sentence. However, if the user input is incorrect, the computer automatically deletes the user input, delivers an error message and provides the user with another opportunity to input the text.

Once the user has correctly typed in the first word, the System advances to the next word in the icon sentence. For example, in FIG. 1, the System would advance to the word in the sentence—"live." 53. All of the steps described in the preceding two paragraphs would then be repeated for that word. These steps would continue to be repeated for each word in the icon sentence until the end of the sentence is reached. Once the user has correctly typed in the entire sentence, the System, in certain embodiments, provides an auditory reading of that entire sentence in the inherent spoken rhythm of the target language. For example, in FIG. 1, when the user reaches the end of icon sentence number 1, the System provides a voiced reading for "they live in Chicago" in the natural spoken rhythm of English. Additional sample lessons are displayed in FIGS. 2–8.

Figure 9:
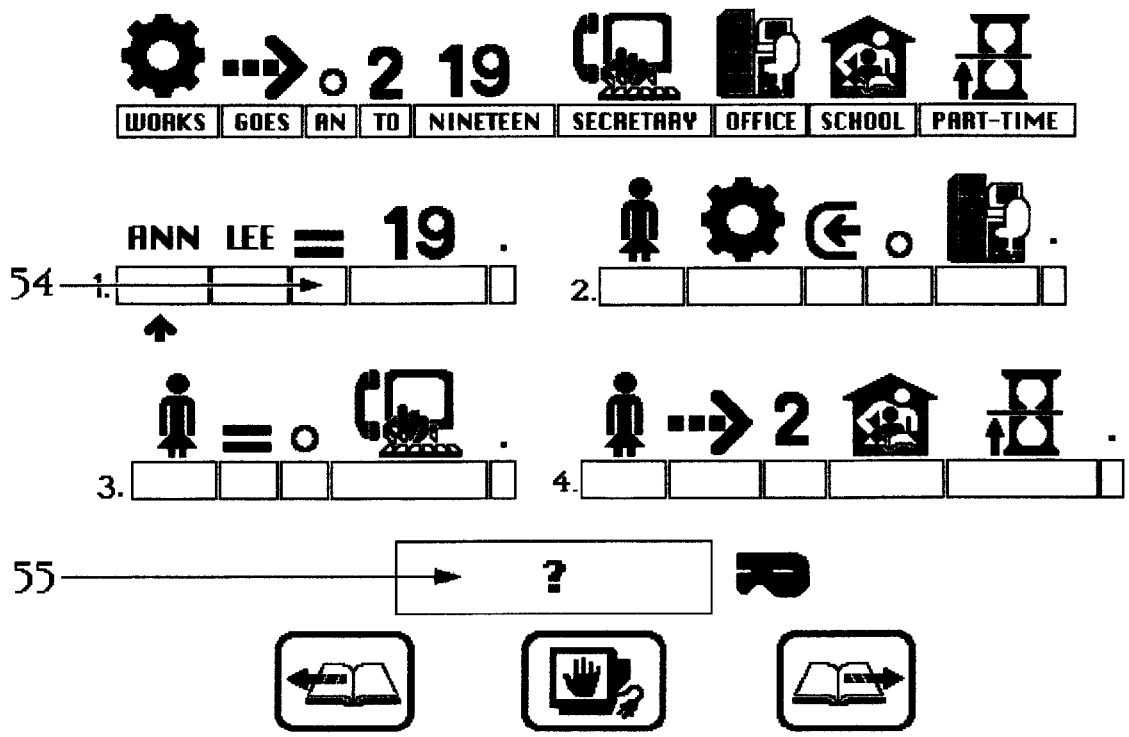
FIG. 9 is a display screen containing a sample lesson in English, exemplary of the invention's capability to display icon blocks for words introduced in other lessons.

In certain embodiments, the System may also provide the user with the capability of hearing the voiced translation of any word in the icon dictionary or any sentence in the sample lesson. The user relies on the user-input device to select the word or sentence she desires to hear, and the System will provide the desired voiced translation. Since the icon dictionary for a given lesson, in certain embodiments, contains only those words that are introduced in that lesson, the System also provides the user with the means to retrieve words that were introduced in previous lessons. For example, if the user was working on icon sentence number 1 in FIG. 9, and was unable to remember the word in the third position of that sentence 54, the user could select the review box 55, which would reveal the text and the voiced translation of the desired word, "is".

One of the advantages of the System is the ability to represent tense by the use of icons. In all languages, tense can be reduced to the present and past tense and participles of certain verbs. Each of these forms—present, past, present participle and past participle—is represented by a distinct icon and is stored in a separate graphics file. All other tenses are formed by combining those present and/or past verbs, and their participles. For example, "I will go" is comprised of two present verbs, will and go. Similarly, "I had gone" is comprised of two past verbs, had and gone. Accordingly, the System, which has an icon to represent each verb, can show tense simply by combining these present and past tenses and their participles.

In certain embodiments, the System demonstrates that a verb is in the past tense form by displaying the present tense icon on a half-toned screen. To show that the participle is being used, the icon is displayed in white on black format, i.e., a white icon on a black background. A complete conjugation of the verb "to do" is displayed in FIG. 10. The present tense of the verb is a black icon on a white background 56. The past tense is displayed on a half-toned screen 57. The future tense is a combination of the present tense icon for "will" and the present tense icon for "do" 58.

To represent the perfect tenses for "do", the System adds the appropriate icon for "to have", and changes the "do" icon to "done" by changing to a white on black icon on a half-toned screen 59. Similarly, to show the continuous tenses for "do", the System adds the icon for "to be" and changes the "do" icon to "doing" by using a white on black icon 60.

Figure 10:
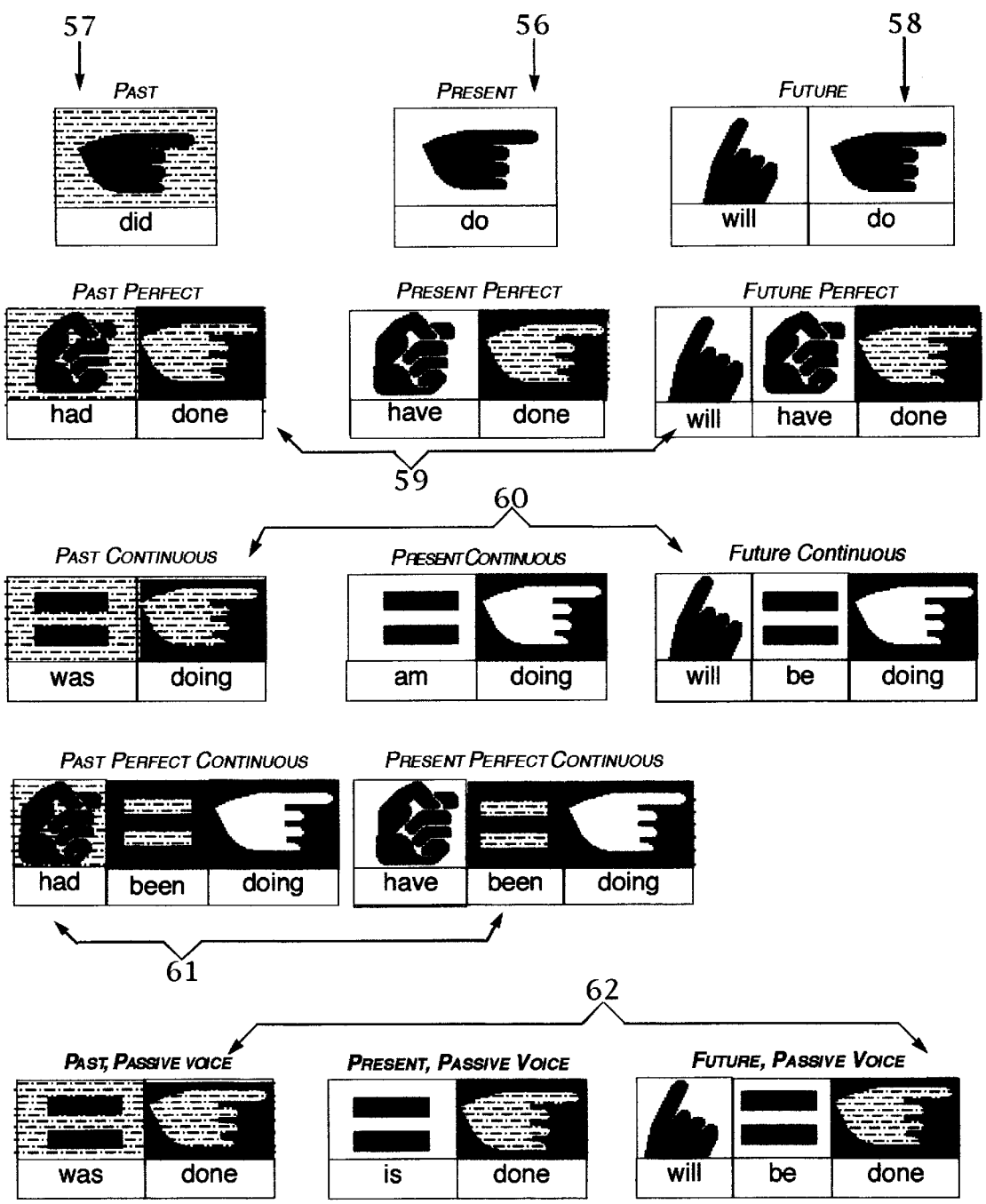
FIG. 10 demonstrates the conjugation of the verb "to do" in one embodiment of the invention.

As shown in FIG. 10, the perfect, continuous forms of "to do" are formed by using either the present or past form of "have", the white on black version of "to be" on a half-toned screen, and the white on black icon for "doing." 16. The passive voice is displayed by using the appropriate icon for "to be" (along with "will" for the future tense) in combination with the past participle of "do"—which is white on black on a half-toned screen 62. This complete conjugation of the verb "to do" in FIG. 10 demonstrates how the System is able to teach all tenses through the use of icons alone.

The system also uses icons to provide a visual depiction of number. To represent the plural of a given noun, the System displays two of the figures used to represent the singular form of the noun. For example, the icon for the noun "children," shown in FIG. 1., 63 displays two of the figures used in the icon that represents the noun "child."

The System also, in certain embodiments, provides users with the capability to build their own sentences using icon blocks. For example, the user is asked whether she wants to construct a question or a statement. The System then provides spaces for the user to fill in. To fill in these spaces, the user selects from a dictionary of icon blocks that would be proper for the particular position in the sentence.

Figure 11:
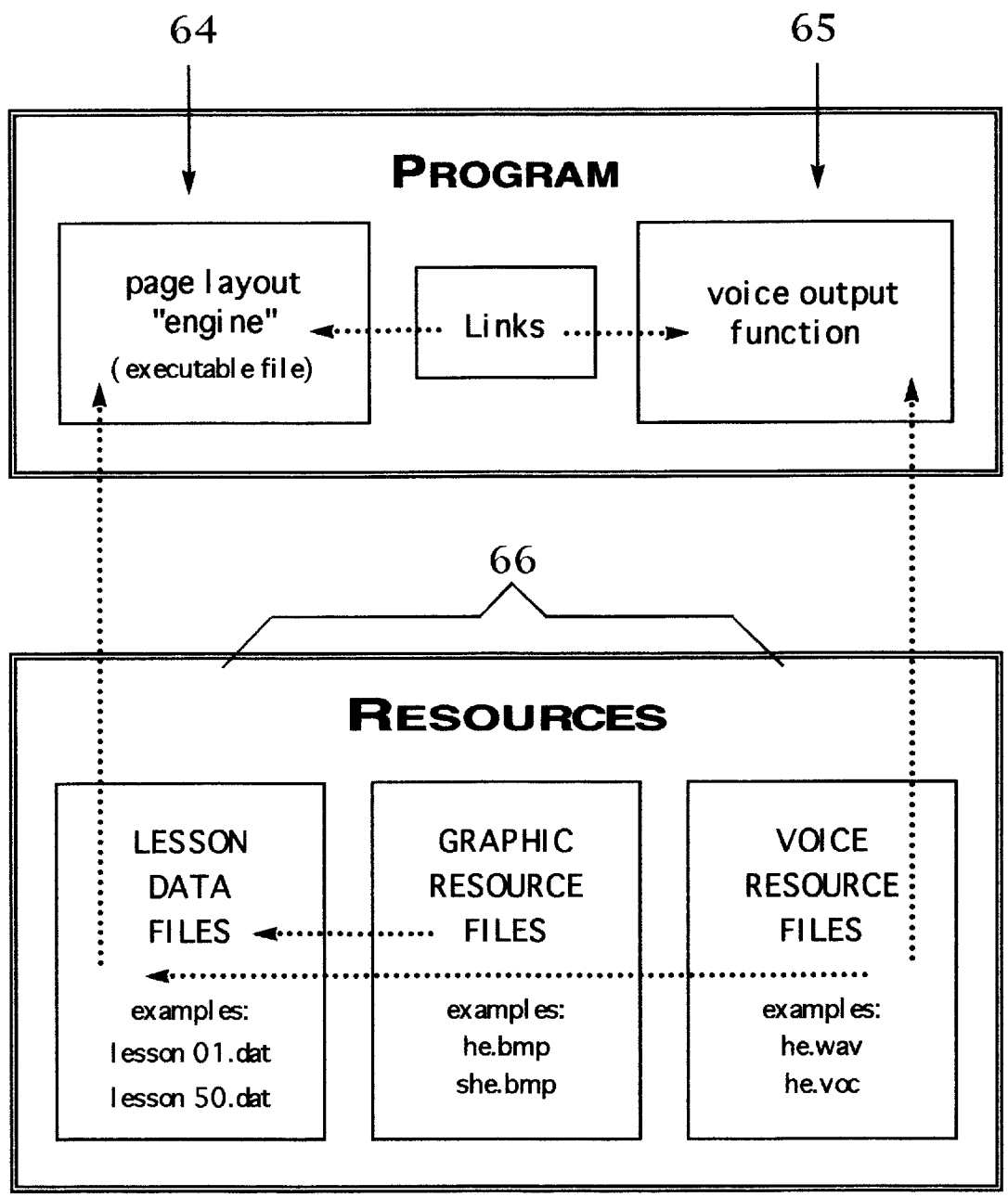
FIG. 11 shows the modular design of the invention's software in certain embodiments.
Figure 12:
FIG. 12 displays exemplary icons of the present invention that represent verbs in the present tense.
Figure 13:
FIG. 13 displays exemplary icons of the present invention that represent verbs in the past tense.
Figure 14:
FIG. 14 displays exemplary icons of the present invention that represent the present participles of verbs.
Figure 15:
FIG. 15 displays exemplary icons of the present invention that represent the past participles of verbs.

In addition, in certain embodiments, the System can be customized to meet the needs of particular groups of users, such as specific age groups. This flexibility is accomplished through the modular design of the software, as shown in FIG. 11, in which the scaffold of the lesson (the executable file) 64, which is linked to a voice output function 65, remains constant, while the elements of each lesson (text, graphic and voice resources—each located in separate resource files 66) are variables and can be easily replaced, expanded or modified. In these embodiments, the hardware and software tools utilized by the System are commonly known to those skilled in the art. For example, the System can use a PC, a DOS operating system, Borland TURBO C++, Sound Blaster (to create and play back voice files) and a graphic editor (to draw bit-map icons), or, in the MacIntosh environment, the System can use a MacIntosh computer, THINK C programming language, and MACPAINT graphics application.

Figure 16:
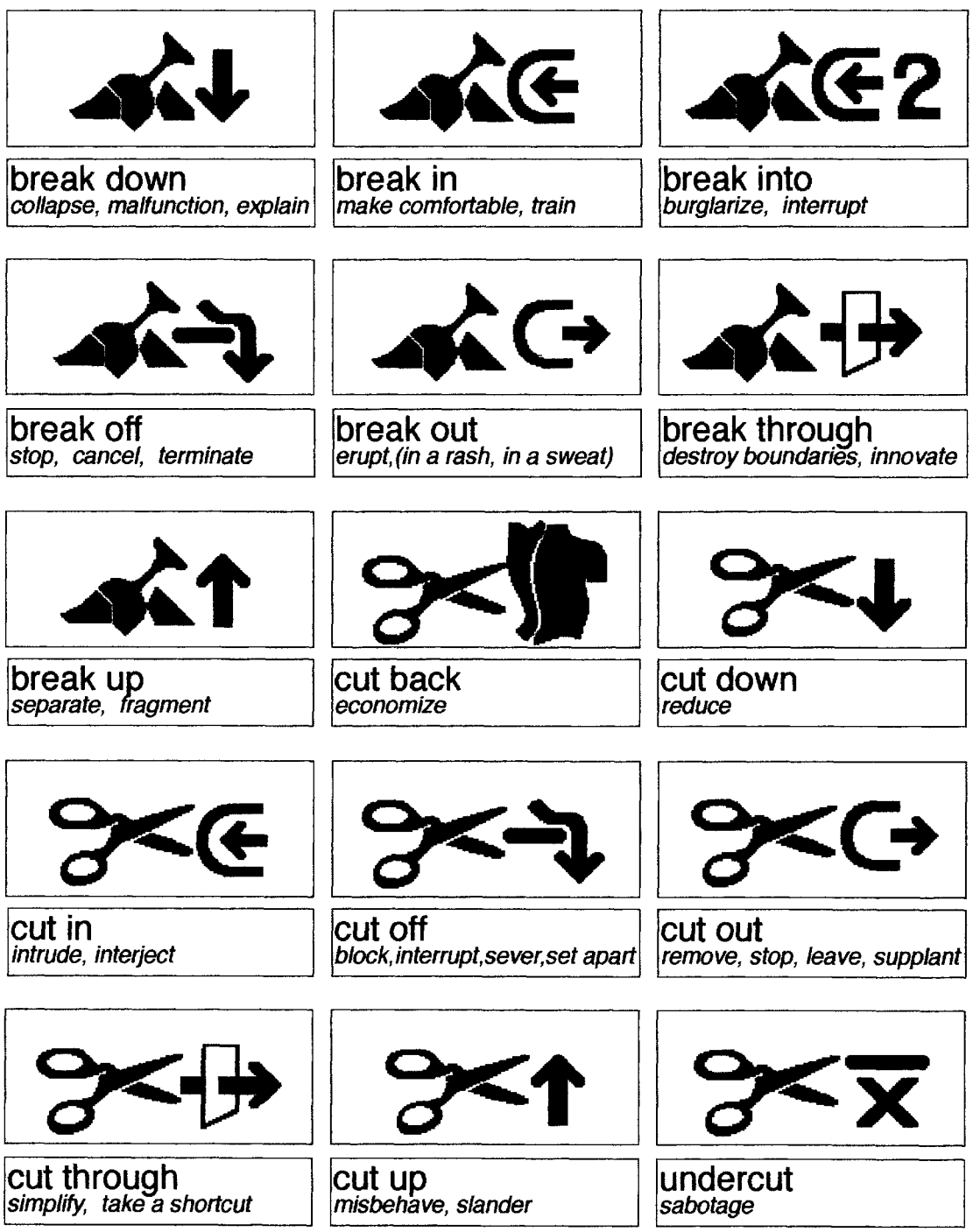
FIG. 16 displays exemplary icons of the present invention that represent two-part verb idioms.
Figure 17:
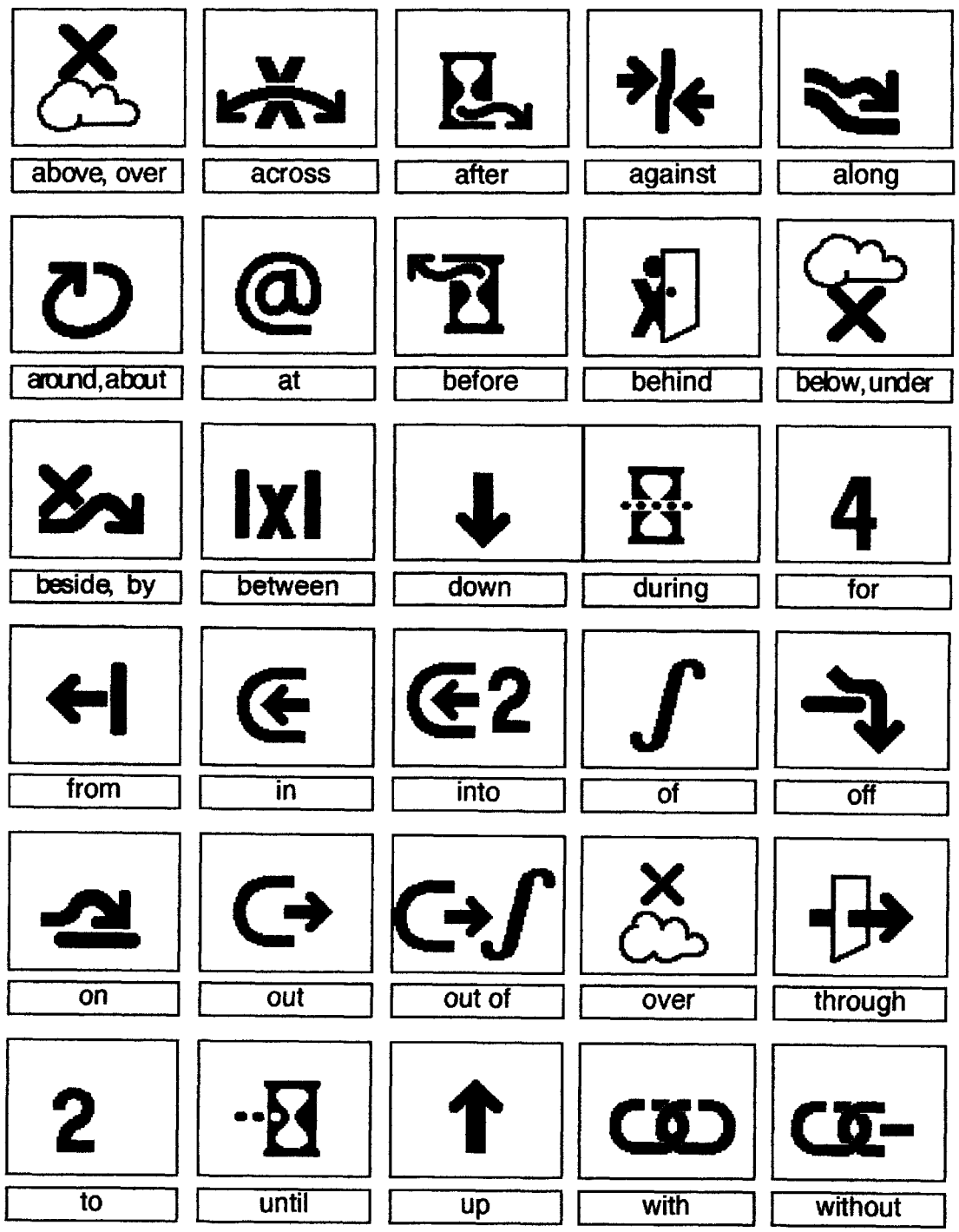
FIG. 17 displays exemplary icons of the present invention that represent prepositions.
Figure 18:
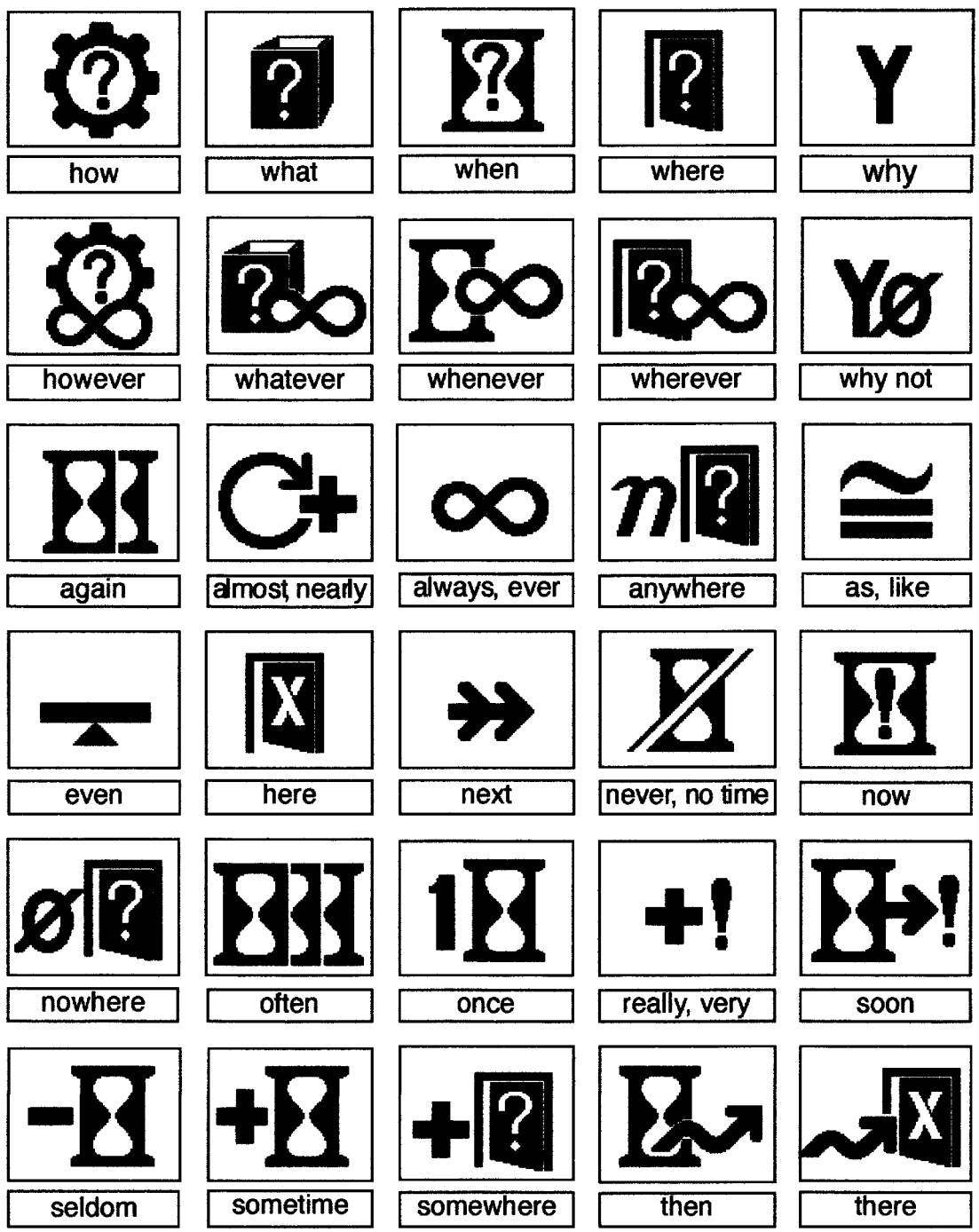
FIG. 18 displays exemplary icons of the present invention that represent question words.
Figure 19:
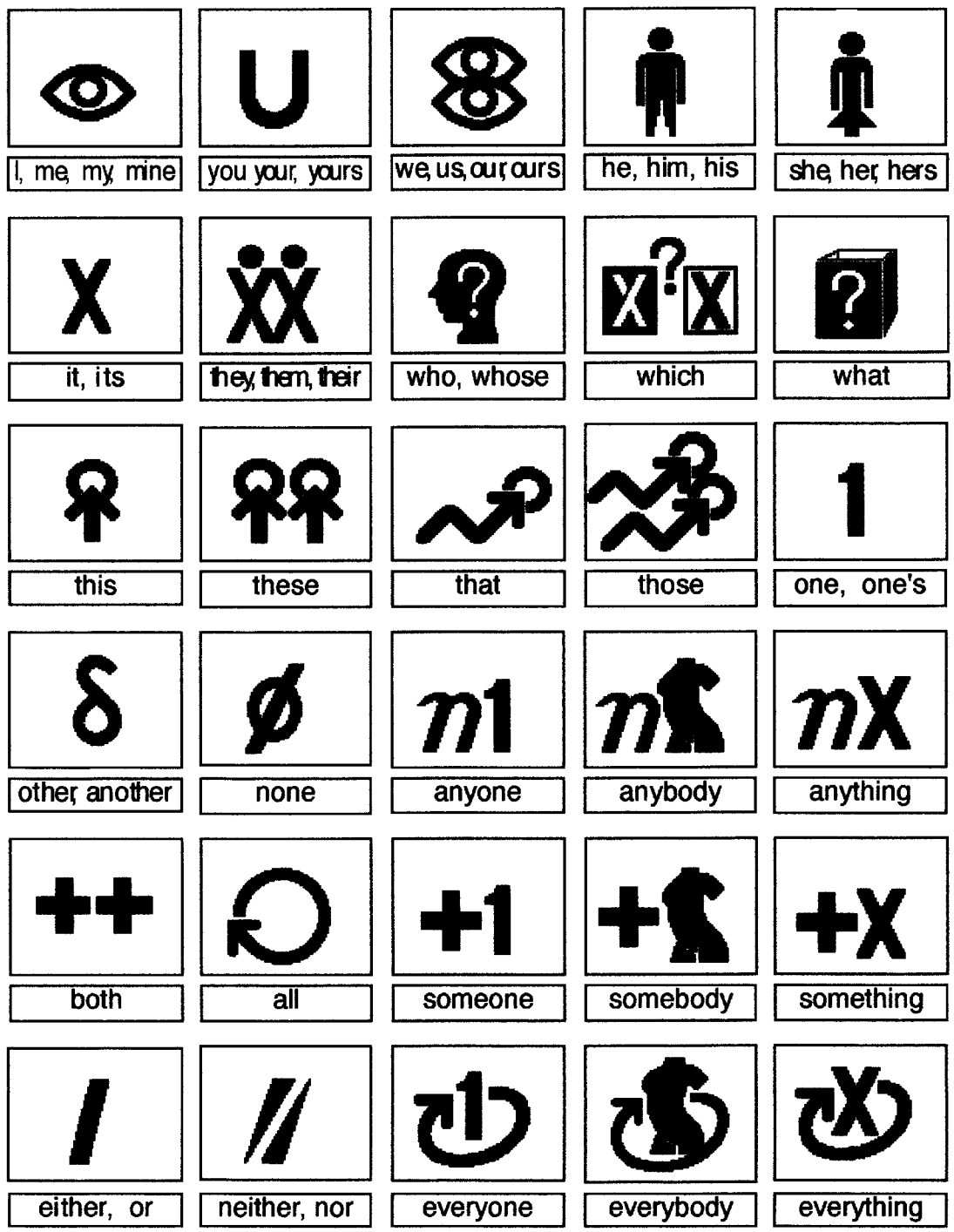
FIG. 19 displays exemplary icons of the present invention that represent pronouns.
Figure 20:
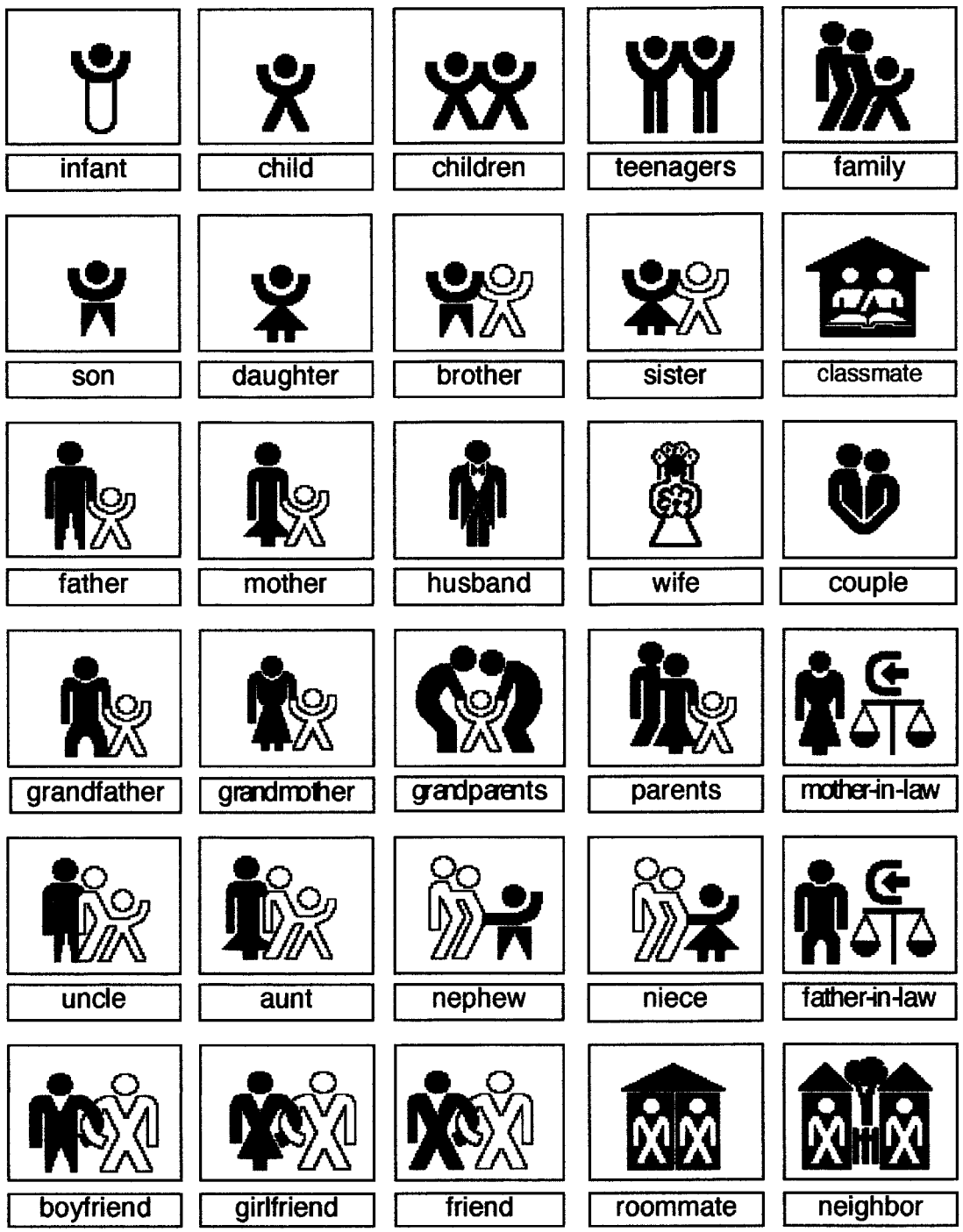
FIG. 20 displays exemplary icons of the present invention that represent nouns.
Figure 21:
FIG. 21 displays exemplary icons of the present invention that represent nouns for occupations.

Since one of the primary advantages of the System is to provide an icon to correspond with each part of speech in the language to be learned, FIGS. 12–21 disclose many of those icons that have been developed by the inventor as of the date of the filing of this application. FIGS. 12–15 disclose icons for certain verbs, and includes present tense, past tense, present participle and past participle. FIG. 16 discloses how the icons can be used to represent two-part verb idioms. FIG. 17 discloses icons for certain prepositions. FIG. 18 provides icons for certain question words. FIG. 19 discloses icons for certain pronouns, while FIGS. 20 & 21 disclose icons for certain nouns, including nouns that represent occupations. Other icons could be developed for use with this System that would fall within the scope of the patented claims. The icons disclosed herein are illustrative only, and are disclosed in order to enable the practicing of the claimed invention.

Figure 22:
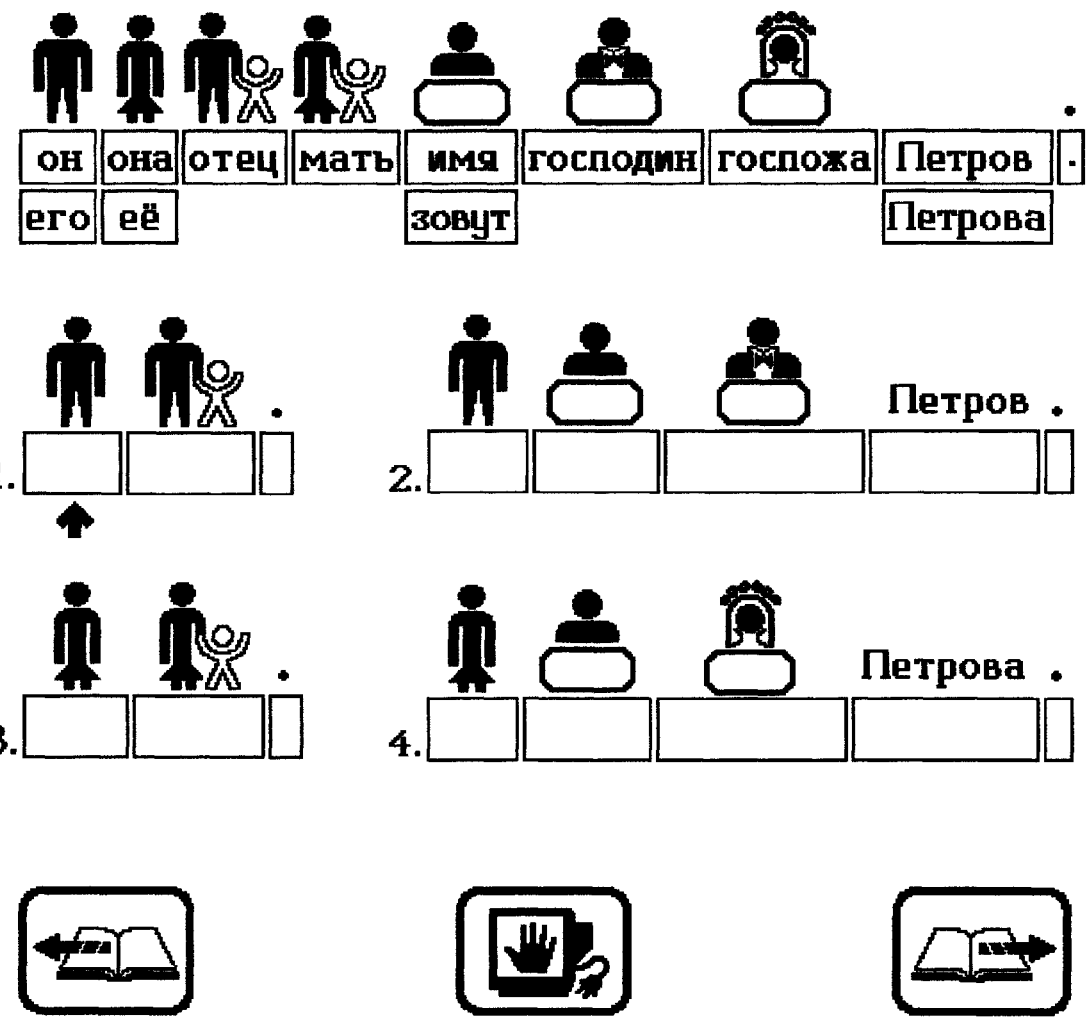
FIG. 22 is a display screen exemplary of the invention containing a sample lesson in Russian.
Figure 23:
FIG. 23 is a display screen exemplary of the invention containing a sample lesson in Russian.
Figure 23:
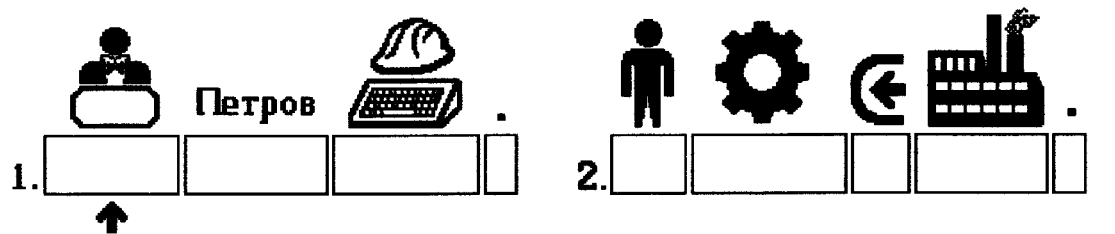
Figure 23:
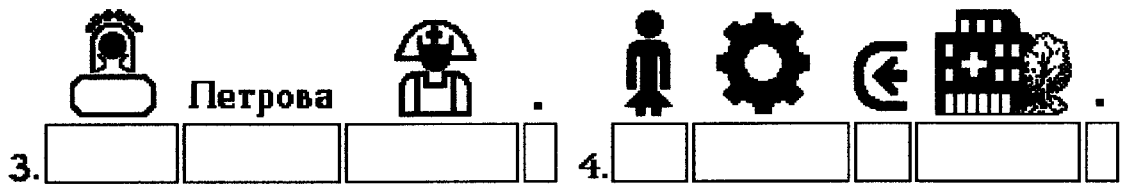
Figure 23:
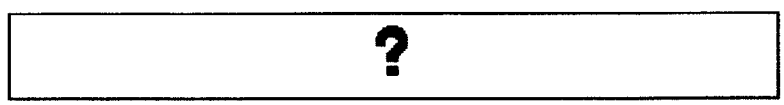
Figure 23:
Figure 23:
Figure 23:
Figure 24:
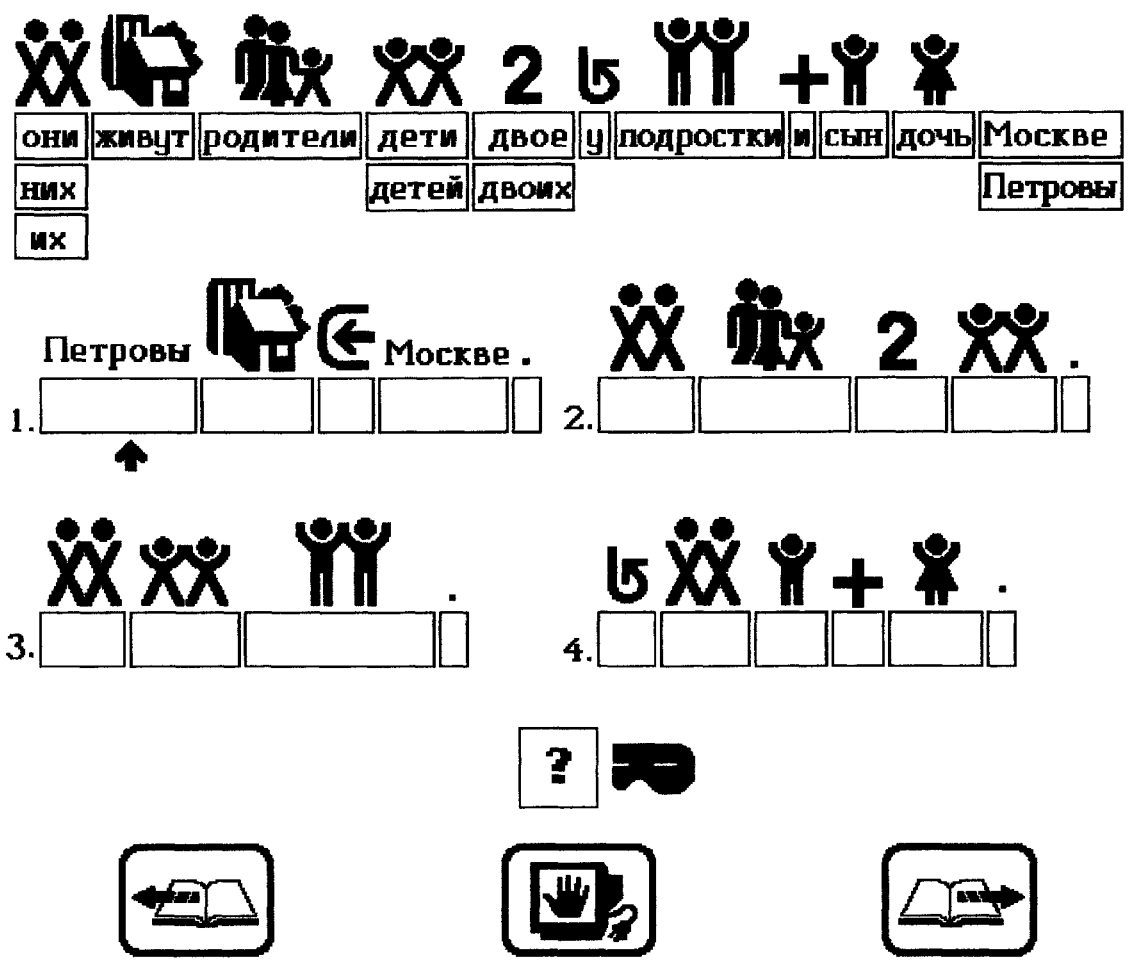
FIG. 24 is a display screen exemplary of the invention containing a sample lesson in Russian.

Finally, the System is not limited to the teaching of English. Indeed, most any language can be taught using the System, provided that a keyboard can be constructed that corresponds to the alphabet, symbols or other elements of that language. FIGS. 22–24 contain three sample lessons for instruction in Russian.

The System has been described with respect to certain embodiments and conditions, which are not meant to and should not be construed to limit the System. Those skilled in the art will understand that variations from the embodiments and conditions described herein may be made without departing from the System as claimed in the appended claims.

In all embodiments, the System provides a unique and tremendously powerful learning opportunity for all users, including double-illiterates (i.e., those who cannot read in their first language). Reliance on a first language is wholly unnecessary due to the System's fusion of an icon, corresponding text that is input by the user and, in certain embodiments, a voiced translation. This fusion allows the user to bypass the first language altogether, and utilize her right brain visual memory in a process similar to the developmental process that occurred when the user learned her first language. This complete elimination of reliance on the first language both expedites and revolutionizes the learning process.

What is claimed is:

1. A computerized interactive multimedia system using icon blocks, which containing graphical units to represent words and punctuation, individually and in sequences forming phrases and sentences for teaching a natural language to the language learner without text translation or instruction, so that the learner who is functioning at zero literacy level in the target language can understand and learn the target language without recourse to translation from the known language to the target language, wherein said system comprising:

a plurality of icon blocks having a one-to-one relationship to every word in a natural language sentence and to the word order of said natural language sentence, such that a sequence of said icon blocks produces a graphical and auditory translation of said natural language sentence exactly paralleling the text of said natural language sentence, wherein each of said icon blocks comprises one pictographic image selecting from the group consisting of a word and a symbol of punctuation mark in the natural language for representing the semantic content of said word or said symbol of punctuation mark; a speech sound of said pictographic image for dictating said word or said symbol of punctuation mark; a spelled name of said pictographic image for prompting said word or said symbol of punctuation mark, a grammar label of said pictographic image for providing part-of-speech information, a gray overlay of a past tense verb image means for representing a past tense state, an image reversal means for changing the color of black-on-white to white-on-black for a participle verb image representing a present perfect tense state, and a combination of said gray overlay means and said image reversal means for representing a past perfect tense state;

processing means for providing interactive instruction comprising an operating system that uses a greater graphical user interface means, wherein said greater graphical user interface means comprising visual objects including scrollable windows, menus, tool bars and icon representations data and functions, to enable an input means to manipulate visual objects on a display means;

memory means for storing applications used in said system along with lessons files and dictionaries of said plurality of icon blocks;

said display means for displaying said visual objects, said icon blocks and the lesson and a plurality of graphical user interface means;

said plurality of graphical user interface means nested within said greater graphical user interface means of said operating system comprising at least one dictionary used for creating, editing and storing said icon blocks in tree structures which assign spelling, grammar and sound to the selected icons, an authoring interface for retrieving, selecting and adding said icon blocks from said dictionaries to the displayed lesson and to delete said icon blocks, and for creating, editing, storing and deleting icon block sentences and pages, and a tutor interface for selecting, opening and using the lessons;

said input means comprising a keyboard for typing, a mouse for selecting data and for manipulating the activation of sound events, and a microphone for creating sound files, output means comprising at least one sound card, speakers and sound software for synthesizing and outputting speech sound corresponding to the selected icon block and icon sentence on said display means;

programmatic means for creating, selecting, editing, saving and using said icon blocks, said dictionaries, said sentences, said lessons and said sound files and for producing synthesized sound by default for every icon block and icon sentence;

correction means for evaluating and correcting said keyboard and said mouse input by the learner;

authoring means for enabling the teacher to create, format and use a plurality of said icon blocks organized into lessons in a plurality of formats including lists, conjugations, phrases, sentences, narrative, dialogs, and songs; and selecting means for enabling said learner to select lessons from a graphical menu which does not require reading any text;

wherein each of said icon blocks is a modular entity and represents a specific and uniquely spelled instance of a word or a symbol of punctuation mark in said natural language with its vocal, semantic and syntactical information attached, said modular entity being an ensemble of attributes having a unique identification number in the source code such that said ensemble can be manipulated as a single object having unique linguistic characteristics which represents a unit of speech.

2. The computerized interactive multimedia system of claim 1, wherein said plurality of icon blocks formatted sequentially in a group, wherein said group is a phrase or a sentence, has a one-to-one correspondence with a plurality of words having the same sequence in the natural language, and wherein said sequence of icon blocks exactly replicates the word order and punctuation of a natural language utterance, such that said icon blocks visually depict the word order, structure, syntax and punctuation of said utterance in said natural language.

3. The computerized interactive multimedia system of claim 2, wherein said modular entity of each individual icon block includes the sound of that icon block and its grammar which can be activated separately by said input means, and a plurality of said modular entity are formatted in the group consisting of lists, lines, phrases and sentences, such that the sounds attached to said formatted plurality of icon blocks can be activated as a whole by said input means, wherein when a plurality of said modular entity are formatted in the sentences, then a recorded passage attached to said sentence, wherein said sound being different than the sounds attached to said individual icon blocks comprising said sentence, and wherein the sound output of said plurality of modular entity and said icon sentence are under the control of the teacher so that the recorded sounds substituted for synthesized sound, and said synthesized sound being the default sound which is automatically present when no recorded sound is selected.

4. The computerized interactive multimedia system of claim 3, wherein when said icon representing verb tense is displayed by a selection of the foreground to background relationship of the icon on the display, such that the past tense is represented by the icon on a light grey background, differentiating the verb from other adjacent icon, and the present perfect tense is represented by changing the color of the icon to white and the background to black, and the past perfect tense is represented by a light grey background with the reversal effect, such that the effects of past tense and perfect tense are combined, and wherein the visual effect created by the light grey overlay and said reversal effect of the icon creates four permutations of tense, and an addition two permutations of tense are achieved by changing the normally black color icon to dark grey color for one of the addition permutations of tense and using a similar reversal effect, that is white on grey, for the other one of the addition permutations of tense, such that when all permutations are used, six verb tenses can be represented, and wherein the visual effects of shading and reversal are easily activated by said teacher to represent verb tense, thereby making the complex grammar construction visually explicit, and wherein all parts of speech are represented, including articles, function words and idiomatic variation, so that complex utterance can be represented in their entirety.

* * * * *